United States Patent [19]

Abrams et al.

[11] Patent Number: 4,779,479

[45] Date of Patent: Oct. 25, 1988

[54] APPARATUS FOR APPLYING A CONSTANT TENSILE FORCE SO A MOVING ELEMENT

[75] Inventors: Jack Abrams, Northbrook; Michael A. Wisniewski, Bolingbrook, both of Ill.

[73] Assignee: Bell & Howell Company, Skokie, Ill.

[21] Appl. No.: 806,367

[22] Filed: Dec. 9, 1985

Related U.S. Application Data

[62] Division of Ser. No. 648,694, Sep. 7, 1984, Pat. No. 4,582,312.

[51] Int. Cl.⁴ .......................... F16C 1/10; F16H 7/10

[52] U.S. Cl. .......................... 74/501.6; 474/112; 474/115

[58] Field of Search .......................... 474/133-135, 474/111, 109, 101, 112, 115; 74/501 R, 501.5 R; 272/134; 187/22, 27

[56] References Cited

U.S. PATENT DOCUMENTS

| | | | |
|---|---|---|---|
| 2,178,066 | 10/1939 | Clark | 74/501 R |
| 2,225,164 | 12/1940 | Ducout | 74/501 R |
| 2,672,057 | 3/1954 | Bratz | 74/501 R |
| 2,922,361 | 1/1960 | Adler et al. | 74/501 R |
| 3,111,230 | 11/1963 | Pesenti | 74/501.5 |
| 3,142,459 | 7/1964 | Baetke | 74/501 R |
| 3,739,741 | 6/1973 | Fireyermuth | 74/501 R |
| 4,041,797 | 8/1977 | Mito | 74/501 R |
| 4,502,570 | 3/1985 | Westerlund | 74/501.5 R |
| 4,511,137 | 4/1985 | Jones | 274/134 |
| 4,615,234 | 10/1986 | Chevance et al. | 74/501 R |

*Primary Examiner*—Gary L. Smith
*Assistant Examiner*—Vinh Luong
*Attorney, Agent, or Firm*—Laff, Whitesel, Conte & Saret

[57] ABSTRACT

A novel spring and dual pulley construction wherein the pulley includes a pair of co-axial grooves, one of the grooves having a constant diameter that accepts a powered cable acting in one direction, while the other groove has a varying radius of curvature that accepts a second cable connected to one end of the tension spring and with the other end of the spring fixedly mounted. This arrangement maintains a constant spring force on a member moving along a slide in a reciprocating fashion and having one side thereof connected to said powered cable for movement in one direction and the other side connected to the second cable for movement in the opposite direction activated by a constant spring force regardless of the extension of the spring.

4 Claims, 8 Drawing Sheets

APPARATUS FOR APPLYING A CONSTANT TENSILE FORCE TO A MOVING ELEMENT

This is a division of application Ser. No. 06/648,694, filed Sept. 7, 1984, now U.S. Pat. No. 4,582,312, issued Apr. 15, 1986.

The present invention relates to a printing apparatus used in association with an insertion machine, and more particularly to an apparatus for printing a variety of bar codes or other indicia on a series of return envelopes or other documents prior to automatically inserting each such return envelope or other documents in a mailing envelope.

The person or entity preparing the envelopes containing the computer generated monthly billing statements may desire to encode the return envelope with certain indicia, denoting special circumstances noted in the billing statement such as significant payment receipts, delinquent accounts, dating of receivables, or the like. This information can be encoded in a "bar code" on one side or the other of the envelope, the bar code comprising a series of long and short bars, for example, which can be printed on each return envelope prior to it being gripped for delivery on the insert transport raceway. Since the data to be placed on each return envelope will vary depending on the status of each individual account represented by the statement placed in the mailing envelope, it is desirable to provide an insertion machine which has the capability of imprinting a different bar code on each envelope, if necessary, and to synchronize the printing of the bar code with data appearing on each statement. In an exemplary apparatus, the data to be imprinted on the return envelope is presented in an optically-scanned format on the billing statement itself, and transmitted electronically or optically to the printing apparatus which imprints the appropriate bar code on the return envelope which will eventually be inserted into a billing envelope with its corresponding billing statement.

Presently available insertion machines do not provide the capability of automatically printing varying information indicia on a return envelope, or any other inserted document, whereby the information imprinted on the envelope corresponds to a condition of the account recorded on the billing statement stuffed into a mailing envelope along with the corresponding return envelope. Certain machines utilize a rubber stamping device at an insert station, but with such apparatus it is impossible to vary the data imprinted on each sequential envelope. Accordingly, it is a primary object of the present invention to provide a printing unit adapted to be mounted at an insert station of an insertion machine for printing specified indicia on an item such as a return envelope to be stuffed in a mailing envelope, whereby the printing apparatus is synchronously controlled by scanning or reading designated marks on the incoming material upstream of the printing unit.

Another object of the present invention is to provide an envelope hopper at an insert station of an insertion machine wherein return envelopes are fed one at a time from the hopper to a printing station, a bar code or other indicia is printed on the envelope, and the envelope is then gripped and delivered to an insert transporting raceway.

Still another object of the present invention is to provide a printing unit located at an insert station of an insertion machine for imprinting information on an envelope, whereby the printer unit is automatically controlled by a scanning device which reads marks on incoming material and transmits the scanned data to control means for the printer unit to change the information imprinted on the envelope while the insertion machine is running, if desired.

Still another object of the present invention is to provide a printing unit to be located at an insert station of an insertion machine which is adjustable to accommodate various sizes of envelopes and to imprint indicia at varying locations on an envelope or other document to be imprinted, whereby the synchronization of all moving parts is strictly maintained throughout the full range of adjustment.

In keeping with an aspect of the invention, these and other objects are accomplished by an insertion machine which in the preferred embodiment includes an apparatus for delivering computer generated billing statements to a transport raceway of the insertion machine. An optical sensor scans data in the form of coded information on the billing statements before the statements are delivered to the transport raceway, and the signal generated by the optical sensor is transmitted to a printing unit mounted on the insertion machine at one of the insert stations. The printing unit or apparatus includes a hopper containing a vertical stack of return envelopes which are fed one at a time from the bottom of the hopper to a pair of feeder arms which drive the envelope under the print head of a laterally and vertically moveable impact print head assembly. Upon placement of an envelope under the print head assembly, the assembly is lowered vertically and the print head moves laterally to sequentially imprint a specified bar code on the upper side of the envelope at the station. When the applicable bar code has been printed on the envelope, the print head assembly is lifted vertically and the print head is moved laterally back to its initial or starting position. The envelope to which the bar code has been applied is then removed from the printing station.

The position of the printer apparatus is adjustable relative to the main frame of the insertion machine to accommodate envelopes of varying sizes, and to allow imprinting of the bar code at different locations on the envelope. A novel power drive connection is provided to ensure that all driven elements of the printing apparatus are rotated at a constant speed cycle throughout the full range of adjustment of the printing apparatus. This provides that there will be no loss of synchronization as a result of adjustment.

In addition, a novel spring and dual pulley construction is provided to maintain a constant spring force on the print head assembly as it moved back and forth laterally, regardless of the extension of the spring. This prevents a build-up of forces acting on the print head assembly, keeps a constant spring force acting on the print head assembly, and significantly prolongs the useful life of the spring used to impart movement to the print head assembly.

A preferred embodiment for accomplishing these and other objects is shown in the accompanying drawings, wherein:

FIG. 1 is a perspective view of an insertion machine including a station for feeding computer generated documents such as billing statements to the transport raceway of the insertion machine, a connection to carry a signal from an optical scanner adjacent the billing statements to a printing apparatus at another station of the insertion machine where a bar code is imprinted on a return envelope, and a stack of billing envelopes into which the inserts on the transport raceway, including a return envelope, are ultimately stuffed;

Figures 1, 2:
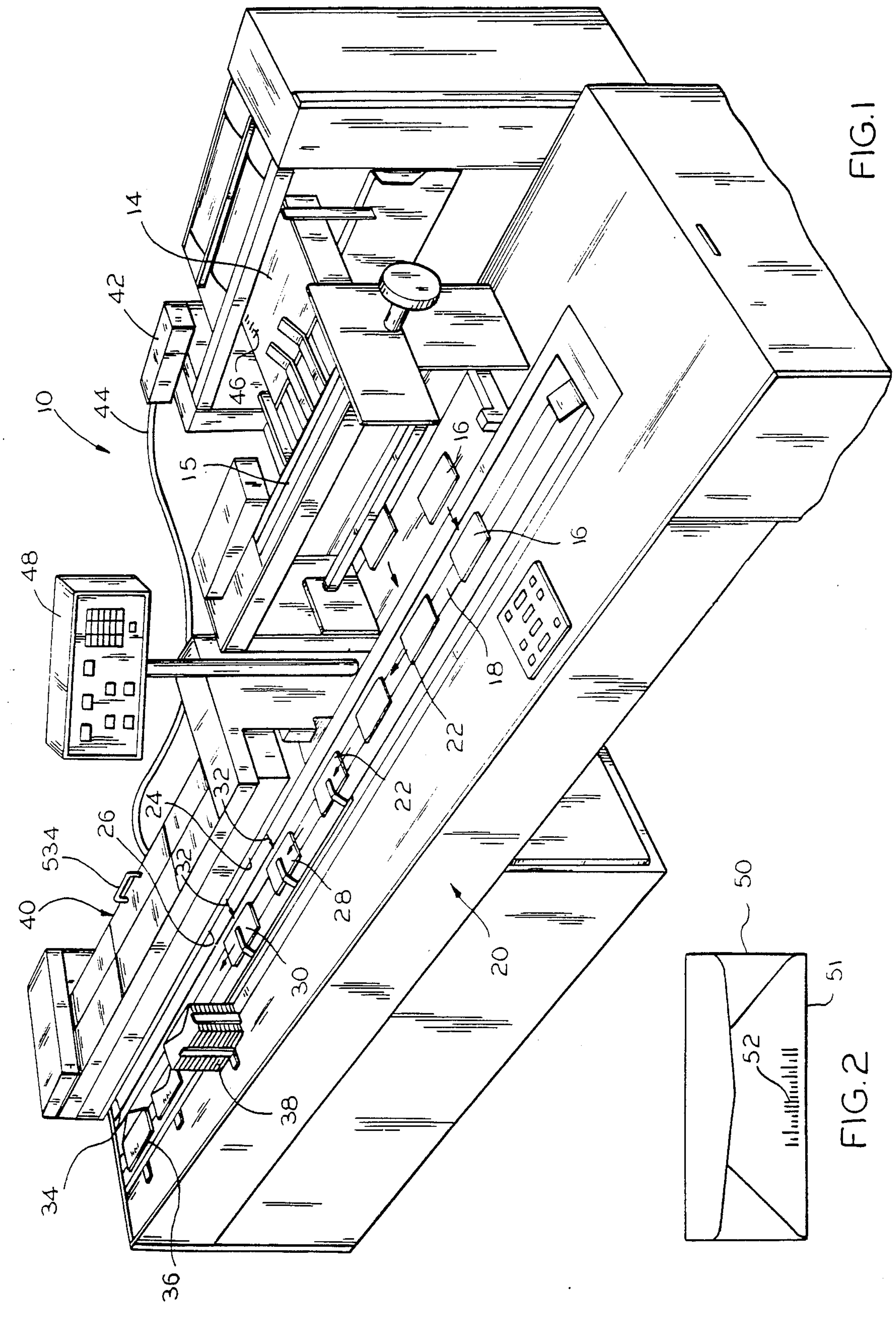
FIG. 2 is a plan view of the rear of an envelope upon which a bar code has been imprinted.

FIG. 1 discloses a computerized automated mailing system, generally designated 10, in association with which the insertion machine and printer apparatus of the preferred embodiment of the present invention is used. The mailing system 10 includes several major elements, including a pin feed cutter 15 which takes pre-printed continuous form computer generated billing statements 14 which are cut, trimmed, folded, and delivered as at 16 on a transport raceway 18 of an insertion machine, generally designated by the numeral 20. The folded billing statements 16 are intermittently transported along raceway 18 in the direction shown by arrows 22, past a plurality of insert stations 24, 26. As each billing statement 16 stops momentarily in front of an insert station 24, 26, an insert document 28, 30 is removed from a stack of insert documents (not shown) at each insert station and deposited atop the billing statement 16 on transport raceway 18 which is in front of that particular insert station. The insert documents 28, 30 are removed from their respective stacks one at a time and initially transported to raceway 18 in a direction shown by arrows 32, and each insert 28, 30 is also placed atop any other insert documents which may have been placed upon transport raceway 18 and billing statements 16 at a previous insert station.

Billing statements 16 with one or more insert documents 28, 30 stacked upon the billing statement, are eventually transported along raceway 18 to a stuffing station 34 of insertion machine 20, where each billing statement and insert document stack is stuffed into a waiting open mailing envelope, as at 36. The envelopes are fed to a position adjacent stuffing station 34 from a hopper 38. After mailing envelope 36 is stuffed with its respective billing statement and insert documents, the mailing envelope and its contents are then transported to a sealing and metering station (not shown) for further processing.

The printing apparatus which is a key element of the combination forming the present invention is diagramatically designated in FIG. 1 by the numeral 40, and is adjustably attached to the insertion machine 20 at a location adjacent one of the insert stations, as at 26. The control system (not shown) for the printing apparatus 40 is in communication with an electronic fiber optic optical scanning and computing device 42 by means of an electrical conduit 44. Optical scanner 42 is adapted to read marks 46 located along the edges of computer generated billing statements 14. In a preferred embodiment of the present invention, marks 46 are arranged in a binary pattern and "instruct" the control system for the printing apparatus as to what specific bar code is to be imprinted on either side of a return envelope, depending on the manner in which the envelopes are stacked in the feed means for printing apparatus 40, as will be explained. Optical scanner 42 is also adapted to control additional functions of the entire automatic inline mailing system 10 in response to marks 46, for example to selectively control which insert documents 28, 30 will be added to each billing statement 16. One suitable scanner is described in U.S. Pat. No. 4,442,347, entitled "Indicia Reading Method and Apparatus." Control means for the system 10, are diagramatically indicated at control box 48.

FIG. 2 illustrates the side of a return envelope 50 which is to be inserted into mailing envelope 36 at stuffing station 34. Envelope 50 is imprinted with a bar code 52 which in the preferred embodiment consists of a linear array of long and short lines which form a binary source of data. The bar code can represent current, 30, 60, or 90 day accounts, for example. When the return envelope 50 is submitted to the payee with a creditor's remittance, the imprinted side of the envelope may be optically scanned, sorted, and processed. This procedure saves significant amounts of time and labor in categorizing and channelling return remittances to large credit institutions.

The present invention relates primarily to an apparatus for automatically imprinting a return envelope 50 with a bar code 52, and synchronizing the application of the appropriate bar code with information generated by optically scanning marks 46 on a computer generated billing statement 14.

Figure 3:
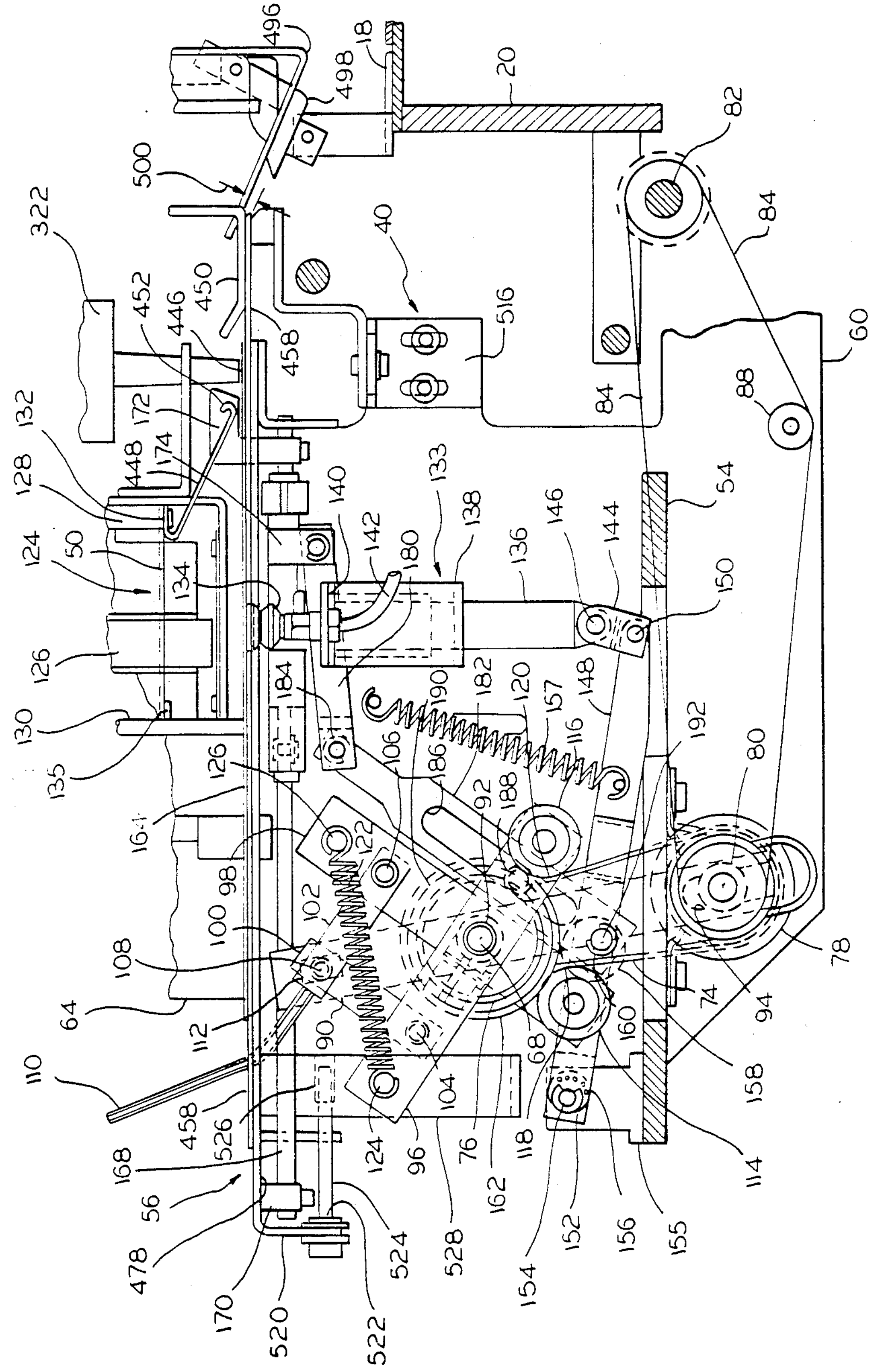
FIG. 3 is a cut-away side elevation view of the lower portion of the printing apparatus of the present invention taken along line 3—3 of FIG. 4, showing inter alia the connection of the operating elements of the printing apparatus with the main power supply derived from the insertion machine with which the printing apparatus is associated.
Figure 4:
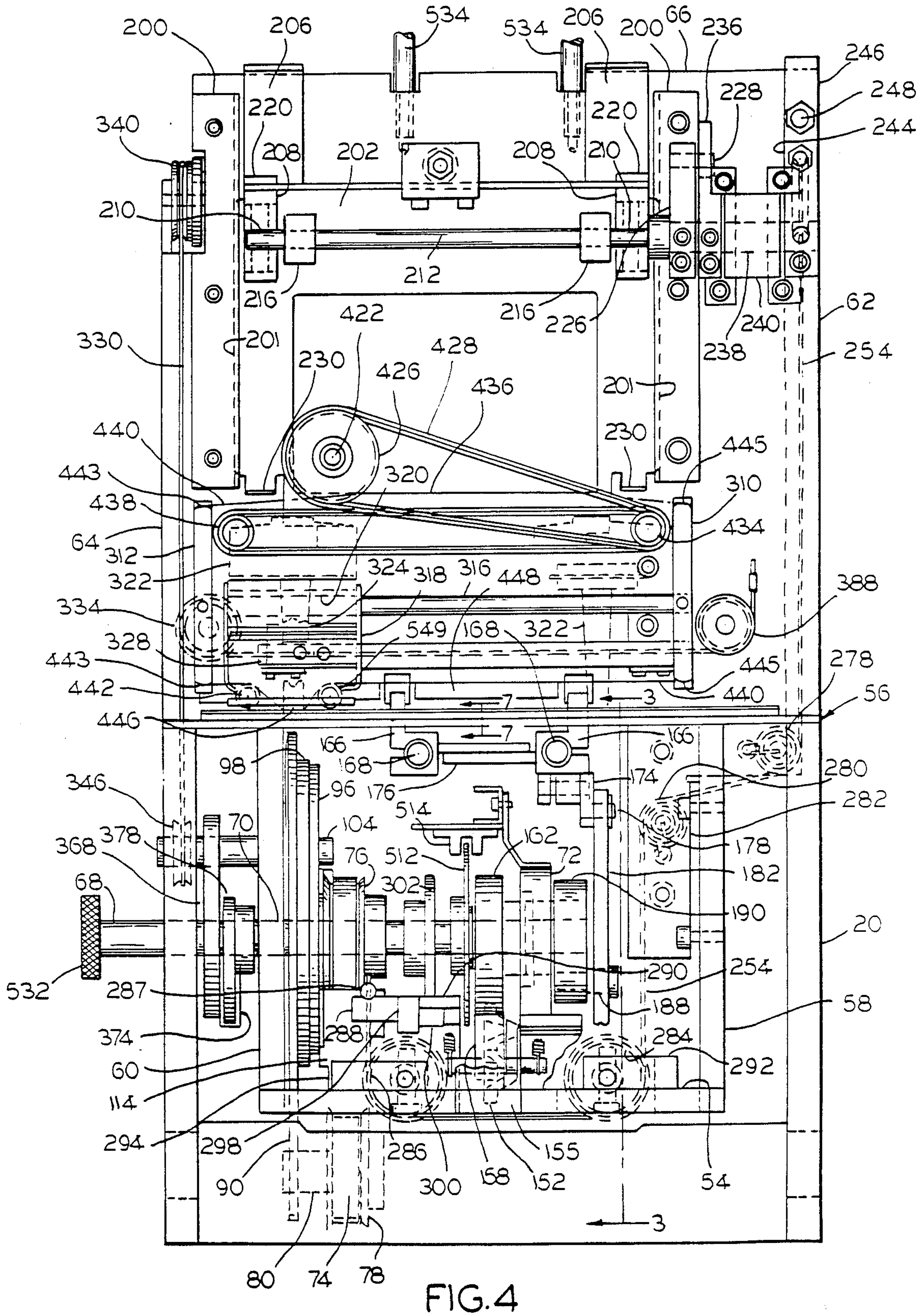
FIG. 4 is a front elevation view of the printing apparatus of the present invention, showing several of the mechanically operating elements thereof.

The details of the printing apparatus 40 are best understood with reference to FIGS. 3-13. Referring first to FIGS. 3 and 4, printing apparatus 40 is generally mounted on a frame structure which consists of a lower base plate 54 and a removable and adjustable upper base plate assembly 56 (FIG. 4), a pair of opposed lower side walls 58, 60, and a pair of opposed upper side walls 62, 64. The rear of the space formed between upper side walls 62, 64 is open, while the forward portion of this space is bounded by face plate 66.

Figure 5:
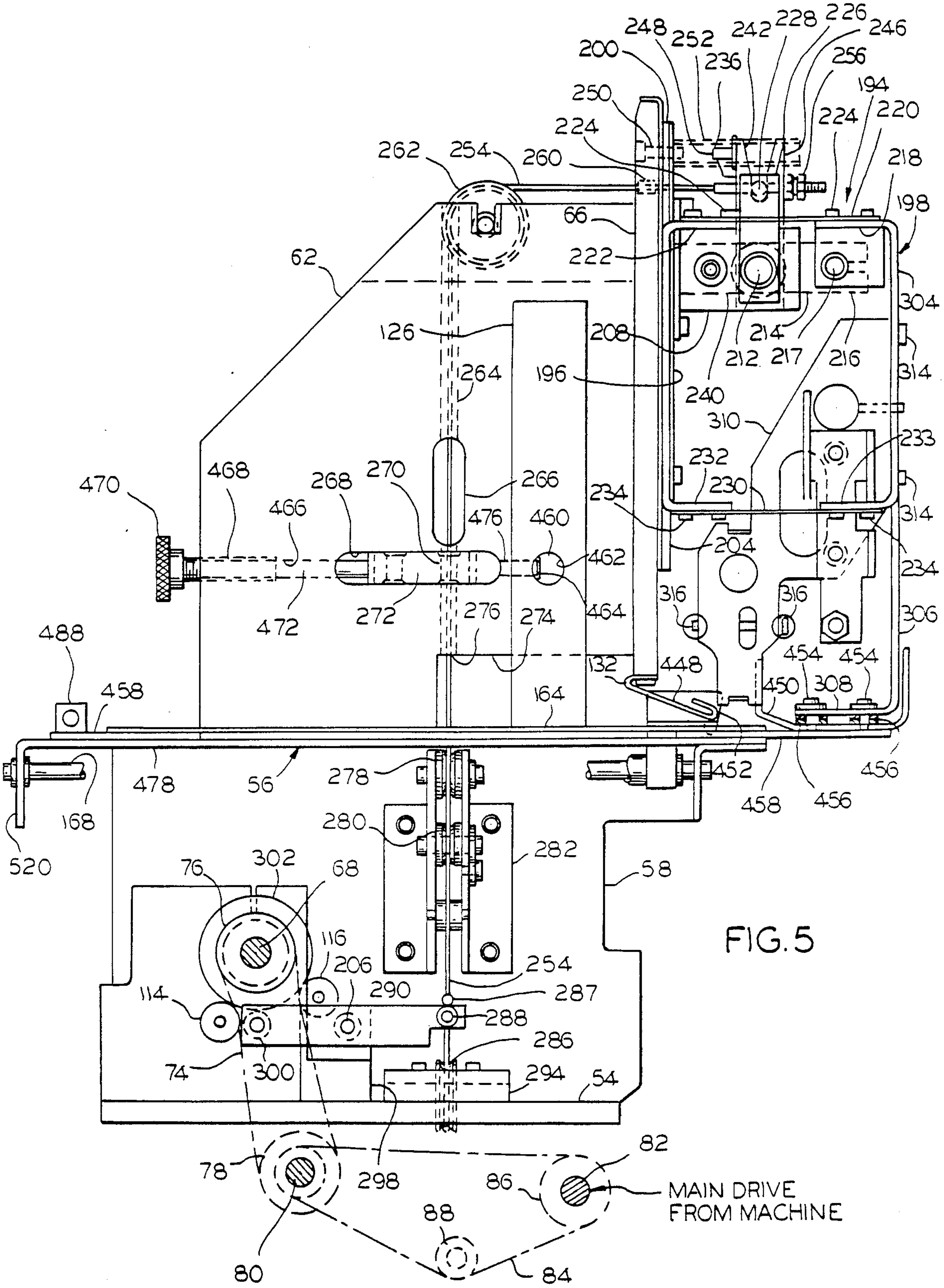
FIG. 5 is a partial cut-away side elevation view of the printing apparatus of the present invention, showing in particular the cam-follower-cable linkage which operates to lift and lower the carriage frame assembly supporting the print head assembly.

A main drive shaft 68 is rotatably mounted in the space bounded by lower side walls 58, 60. One side of shaft 68 is supported by a bearing extending through an aperture 70 in side wall 60, and the other side of shaft 68 is supported by bearing block 72 which rests on and is fixed to lower base plate 54 (FIG. 4). Rotative power is delivered to shaft 68 by means of a timing belt 74 trained around pulley 76 which is rigidly fixed to shaft 68. Belt 74 extends around a second pulley 78 which is fixed to shaft 80. Referring to FIG. 5, it can be observed that power is delivered to shaft 80 and in turn to shaft 68 from primary continuous speed drive shaft 82 of insertion machine 20 by means of a belt 84 extending around pulley 86 fixed to shaft 80, and around a tension maintaining idler pulley 88.

To maintain the synchronous relationship between the power derived from insertion machine 20 through shaft 82, and the power transmitted to the operating elements of printing apparatus 40 through shaft 68 when adjusting printing apparatus 40 to accommodate envelopes 50 of varying sizes, as will be explained in greater detail, a scissors-type mechanism is provided to maintain a constant tension in belt 74 as it extends around pulley 76. This scissors mechanism comprises a main pulley shaft support arm 90 which is rotatably mounted about shaft 68 by a bushing 92 which permits shaft 68 to rotate relative to arm 90, and allows arm 90 to rock back and forth around shaft 68 as the position of printer apparatus 40 is adjusted in or out to compensate for various size envelopes. The lower end of arm 90 includes a slot 94 which extends around shaft 80 with sufficient lateral play to allow the lower end of arm 90 to move in a slight arc without interfering with shaft 80.

A pair of first scissor arms 96, 98 are also rotatably mounted about shaft 68 at approximately right angles to each other by means of suitable bushings (not shown) which allow each arm 96, 98 to rotate relative to each other and relative to shaft 68. A pair of second scissor arms 100, 102 are pivotally mounted to arms 96, 98 at one end by means of pins 104, 106 respectively, and to each other at opposite ends by means of pin 108. Associated with pin 108 is a friction locking device (not shown) which is manually operated by release arm 110. When printing apparatus 40 is laterally adjusted relative to insertion machine 20, release arm 110 is moved to allow the scissors action of arms 90, 96, 98, 100 and 102 to be activated. Pin 108 is mounted in slot 112 of arm 90 to allow pin 108 to move along the centerline of arm 90 when the scissors action is operative.

A pair of tension rollers 114, 116 are rotatably mounted on the lower ends of arms 96 and 98, which are adapted to intimetly engage belt 74 as at 118, 120 at points below pulley 76. A tension spring 122 extends between pins 124, 126 which are mounted on arms 96, 98 respectively, and applies sufficient force to keep the upper ends and lower ends of arms 96, 98 biased toward each other. As the lower ends of arms 96, 98 are biased inward, tension rollers 114, 116 tightly engage opposite runs of belt 74 at points 118 and 120, taking up any slack that may be present in belt 74. Thus, when printing apparatus 40 is adjusted laterally (as viewed in FIG. 3) with the power source to shaft 80 turned off, arm 90 will pivot slightly about shaft 98, causing the entire scissors mechanism to also pivot slightly. Tension spring 122 keeps tension rollers 114, 116 pressed against belt 74, and prevents the portion of belt 74 in engagement with pulley 76 from slipping, thereby maintaining the tension on pulley 76. Because of tension rollers 114, 116 and tension spring 122, belt 74 is forced to wrap and unwrap around pulley 76, which allows printer apparatus 40 to shift laterally (FIG. 3) without transmitting a rotative force to shaft 68. It is important to prevent drive shaft 68 from rotating while laterally adjusting printer apparatus 40 in order to maintain the synchronization of all moving parts driven by shaft 68 throughout the entire range of adjustment of the printer. Once the adjustment of printer apparatus 40 has been accomplished, release arm 110 is re-positioned to lock arms 90, 100 and 102 against relative movement, thereby locking the entire above-described scissors mechanism.

Printer apparatus 40 also includes means for removing return envelopes 50 one at a time from a hopper 124 (FIG. 3) located above upper base plate assembly 56. Hopper 124 comprises a series of vertically extending envelope guides 126, 128, 130, whereby guide 126, and its opposite counterpart (not shown in FIG. 3) are adapted to move toward each other to compensate for return envelopes of various sizes. The forward edge of the bottommost envelope 50 in the stack of envelopes in the hopper 124 rests against rounded ledges 132, 135, which aid in keeping the envelopes elevated above base plate assembly 56 until they are withdrawn by the envelope feed elevator mechanism described hereinbelow.

The envelope feed elevator mechanism 133 (FIG. 3) comprises a pair of aligned suction cups 134 (only one shown) mounted on an elevator piston 136 which is slidably mounted for vertical movement in fixed bracket 138. The upper portion of piston 136 includes a plate 140 upon which are mounted suction cups 134. A vacuum force is supplied to suction cups 134 through flexible hose 142 which is connected to suitable valved vacuum source (not shown).

The lower end of piston 136 is pivotally connected to a bracket 144 by means of pin 146. Bracket 144 is also connected to the forward end of suction cup operating arm 148 by means of pin 150. The rear end of operating arm 148 is pivotally attached to an adjustable eccentric mounting disc 152 by means of pin 154. Disc 152 is rotatably mounted on a stationary bracket 155, which is fixed to lower base plate 54. Pin 154 is eccentrically mounted on disc 152, and by rotating disc 152, the fulcrum about which arm 148 rotates is laterally shifted to allow adjustment of the uppermost point of vertical travel of suction cups 134. Apertures 156 are provided in rotating disc 152 to enable disc 152 to be locked into position once the proper height of suction cups 134 has been established.

Cam follower 158 is rotatably mounted to suction cup operating arm 148 located between pin 154 and pin 150. Cam follower 158 engages cam 162 which has a cammed surface and is mounted on shaft 68 for rotation therewith. As cam 162 rotates, follower 158 causes suction cup operating arm 142 to reciprocally pivot about pin 154, thereby causing piston 136 and suction cups 134 to reciprocate vertically. A spring 157 is provided between suction cup operating arm 148 and side wall 60 to bias arm 148 in an upward direction and ensure that cam follower 158 engages cam 162.

Figure 7:
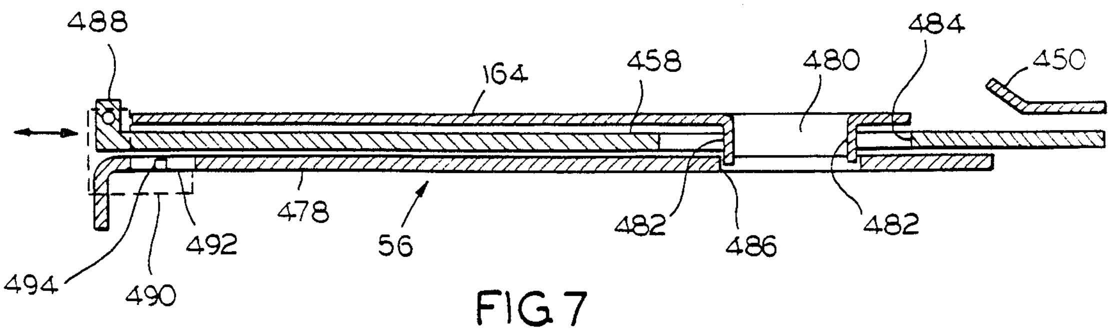
FIG. 7 is a cut-away side view of the envelope platen assembly, taken along the line 7—7 in FIG. 4.

As will be explained in greater detail, the purpose of suction cups 134 is to remove a single return envelope 50 from the stack of envelopes in hopper 124, and place the envelope 50 on top of platform 164, which forms a part of upper base plate assembly 56 (FIG. 7). Once placed on platform 164, means are provided to transport the single envelope 50 horizontally across platform 164 to a position under the print head, as will be described. The means for transporting the envelope 50 across platform 164 comprises a pair of envelope feed pusher pins 166 (FIG. 4) which extend upward through upper base plate assembly 56 and platform 164 to engage the trailing edge of each return envelope 50 as it is deposited on platform 164 by means of suction cups 134. Referring to FIGS. 3 and 4, each pusher pin 166 is slidably mounted for forward and backward movement on a slide rod 168, which in turn is fixedly mounted to upper base plate assembly 56 by means of brackets 170 and 172. An operating arm 174 extends downward from one of pusher pins 166, and the two pusher pins 166 are integrally connected by means of spanning element 176. Pivotally attached to operating arm 174 by means of pin 178 is an arm 180 (FIG. 3) which is pivotally connected to a bell crank lever arm 182 by means of pin 184. A slot 186 extends partially along the length of bell crank lever arm 182, and a cam follower 188 extends through slot 186. The other end of cam follower 188 is fixed to the outer extremity of disc 190 which is rigidly attached to shaft 68 for rotation therewith. The lower end of bell crank lever arm 182 is pivotally attached to the frame of imprinting apparatus 40 by means of a pin and bracket assembly, shown at 192 in FIG. 3.

As disc 190 rotates with shaft 68, cam follower 188 rotates in a circle, and moves longitudinally in slot 186 of bell crank lever arm 182. This drive means imparts reciprocal motion to pin 184 of arm 182, which in turn reciprocally drives pusher pins 166 forward and backward along slide bars 168 by means of arm 180. When cam follower 188 is adjacent pin 192 as disc 190 rotates, bell crank lever arm 182 travels at a relatively fast rate due to the short distance between cam follower 188 and pin 192. This faster rate is imparted to pusher pins 166 during their return stroke, subsequent to depositing an envelope 20 beneath the print head. The forward stroke is slower than the return stroke, since cam follower 188 is at a further distance from pin 192 during this phase of the rotation of disc 190. Thus, the bell crank lever arm 182 and its associated elements drives pusher pins 166 at a first rate of speed during the forward stroke of pins 166, and at a faster rate during the return stroke. This enables pusher pins 166 to be rapidly withdrawn from beneath the next envelope 50 in hopper 124 which is to be engaged by suction cups 134 and drawn down to platform 164.

Referring to FIGS. 5, 6, 9 and 10, the print head frame assembly 194 will next be described. Print head frame assembly 194 consists of two primary structures: a fixed carriage assembly 196 and a moveable print head mounting carriage 198. Fixed carriage 196 has a generally U-shaped configuration and is mounted to the outer face of face plate 66 by means of a pair of guide flange elements 200 into which the edges 201 of plate 202 forming the back of fixed carriage assembly 196 are slid vertically. A stop member 204 limits the downward movement of carriage assembly 196, and a pair of low friction strips 206 are located along the outer face of plate 66 to enhance the ease with which carriage assembly 196 may be inserted or withdrawn from guide flanges 200.

Extending forward from and fixed to the front of plate 202 are a pair of spaced apart brackets 208 (FIG. 4) having apertures 210 therein for receiving a shaft 212. A pair of spaced apart lift arms 214 are rigidly mounted to shaft 212 for rotation therewith and extend outward therefrom. Arms 214 are pivotally attached at their outer ends to a pair of bracket members 216 which are fixed by means of groumets 217 to laterally extending portion 218 of moveable print head mounting carriage 198.

A pair of flat upper spring steel elements 220 (FIGS. 4, 5) extend between the upper portion 222 of fixed carriage assembly 196 and laterally extending portion 218 of moveable print head mounting carriage 198. A plurality of rivets 224, or other suitable fastening means, rigidly secure spring steel elements 220 to their respective support means.

A vertically extending lever arm 226 is rigidly attached to shaft 212 to impart a small degree of rotative motion to shaft 212 and lift arms 214 as will be explained. A clevis pin 228 is attached to lever arm 226 and extends at a distance from but parallel to the longitudinal axis of shaft 212. Thus, it is apparent that as lever arm 226 is rotated clockwise or counterclockwise as viewed in FIG. 5, shaft 212 rotates, thereby rotating lift arms 214, and in turn lifting moveable print head mounting carriage 198.

In the context of the printing function to be accomplished by the present invention, and to maintain the synchronous relationship between all moving elements mounted on moveable print head mounting carriage 198, it is important that mounting carriage 198 be lifted in translation without rotating by lever arm 226, although the rotation of shaft 212 by lever arm 226 causes the outer edges of lift arms 214 to move in an arcuate path, rather than a pure vertical path. To accomplish clear vertical movement of moveable print head mounting carriage 198, a pair of lower spring steel elements 230 extend from a lower laterally extending portion 232 of fixed carriage 196 to a lower laterally extending portion 233 of moveable print head mounting carriage 198. Spring elements 230 are the same length as sprng steel elements 220, and with spring elements 220 form a somewhat parallelogram configuration with fixed carriage assembly 196 and moveable print head mounting carriage 198. Lower spring steel elements 230 are fixed to their respective supports by rivets 234, or other suitable attachment means.

As lever arm 226 is rotated clockwise or counterclockwise by movement of lever arm 226, lift arms 214 are rotated by shaft 212, and moveable print head mounting carriage 198 is raised or lowered. The arcuate movement of the outer ends of arms 214 is designed to match the normal path of deflection of the ends of steel spring elements 220 and 230, where the path of the outer or right end of spring steel elements 220, 230 has been calculated to enable the right end of each spring element to move within .001 inch of a true arc. This limited arcuate movement maintains the parallelogram structure formed by spring elements 220, 230, and results in moveable print head mounting carriage 198 being lifted or lowered vertically.

The rotative movement of lever arm 226 is effected by a linkage system (FIGS. 4, 5) including a clevis arm 236 which is mounted to a shaft 238, which in turn is mounted to a bracket 240 which is fixed to and extends laterally from face plate 66. Clevis arm 236 includes a V-shaped slot 242 adapted to receive and secure clevis pin 228 when print head frame assembly 194 is mounted on face plate 66 by sliding edges 201 into flanges 200, as previously described. When print head frame assembly 194 is removed from face plate 66 for adjustment or maintenance, clevis pin 228 readily rides out of the open upper end of slot 242.

A clevis lever arm 244 (FIG. 4) is rigidly attached to the opposite end of shaft 238, whereby rotation of lever arm 244 will cause shaft 238 and clevis arm 236 to rotate. An upward extension 246 of lever arm 244 includes an adjustable pin 248 extending therethrough which is adapted to abut a spacer pin 250 fixed to face plate 66. A spring 252 extends between face plate 66 and extension 246, and around pins 248 and 250, to bias clevis lever arm 244 outward.

The terminus point of a cable 254 is adjustably secured to clevis lever arm 244 through an aperture in upward extension 246 of the clevis lever arm. The vertical distance that print head mounting carriage 198 is permitted to travel is adjusted by nuts 256 and threaded portion 258 of cable 254 which provide the means to loosen or tighten cable 254 relative to clevis lever arm 244. Cable 254 extends from clevis lever arm 244 through an aperture 260 in face plate 66, around an idler pulley 262 mounted on top of upper side wall 62, and into longitudinal channel 264 formed inside upper side wall 62. A vertical slotted aperture 266 is formed in upper side wall 62, through which cable 254 passes, forming an opening in the side wall to permit the cable to be serviced in case of a malfunction. Cable 245 also extends through a portion of a horizontal slotted aperture 268, and through a channel 270 formed in a sliding block 272 located in slotted aperture 268 for purposes to be explained.

The lower portion of upper side wall 62 comprises a cut-out portion 274, and cable 254 emerges from the interior of upper side wall 62 through an aperture 276 located at the juncture of channel 264 and cut-out portion 274. Cable 254 then extends past upper base plate assembly 56 and around pulleys 278 and 280 which are mounted to lower side wall 58 by means of bracket 282. Cable 254 then passes over a pair of pulleys 284, 286 and beneath lower base plate 54 where it is fixed at 287 to an anchor pin 288 on head lift lever arm 290. Pulleys 284, 286 are rotatably fixed to lower base plate 54 by means of mounting blocks 292, 294.

Referring to FIG. 5, head lift lever arm 290 is pivotally mounted at approximately its center on pin 296 to a support member 298 attached to lower base plate 54. The end of head lift lever arm 290 opposite anchor 288 includes a cam follower 300 which engages and is operated by an eccentric head lift cam 302. Eccentric head lift cam 302 is rigidly fixed to main drive shaft 68 for rotation therewith. Thus, when main drive shaft 68 rotates, cam 302 drives cam follower 300, head lift lever arm 290, and cable 254 to rotate clevis arm 236 toward or away from face plate 66. When clevis arm 236 rotates toward face plate 66, clevis arm 236 engages clevis pin 228, thereby rotating lever arm 226, shaft 212 and lift arm 214 in a counterclockwise direction, as viewed in FIG. 5, causing moveable head mounting carriage 198 to lift vertically. As explained previously, the arcuate motion of lift arms 214 is accompanied by vertical movement of mounting carriage 198 by means of the four spring steel elements 220 and 230. Likewise, when clevis arm 236 is rotated away from face plate 66 by cam 302, moveable print head mounting carriage 198 is lowered vertically for purposes to be explained.

Moveable print head mounting carriage 198 includes support structure to mount a laterally displaceable ballistic head print assembly, an automatically fed inked ribbon, and means to capture an envelope which has been deposited beneath the print head by pusher pins 166. The main support structure of printing apparatus 40 includes means to interface with the print head assembly and to drive the print assembly laterally across the rear face of the envelope 50, and to return the print assembly to its starting position following the printing operation.

Referring to FIG. 5, moveable print head mounting carriage 198 comprises a main frame element 304 from which portions 218 and 233 extend laterally inward. Frame element 304 includes a lower extension 306 having an inwardly extending flange 308. Side panels 310, 312 (FIG. 8) are fixed to and depend substantially outward and downward from opposite sides of frame element 304 by means of bolts 314. A pair of rails 316 extend between side panels 310, 312, and a print head mounting block 318 is mounted for lateral movement along rails 316. A pair of apertures 320 are provided in block 318 through which rails 316 extend.

A standard ballistic head print module 322 is secured to mounting block 318 for lateral movement therewith along rails 316. As seen in phantom in FIG. 4, print head module 322 travels between a start position (left side) to a finish position (right side). The operation of print head module 322 is responsive to a computer generated signal which directs the module 322 in printing a bar code 52 on an envelope 50 in accordance with data received by optical scanner 42 from marks 46 (FIG. 1).

Figure 6:
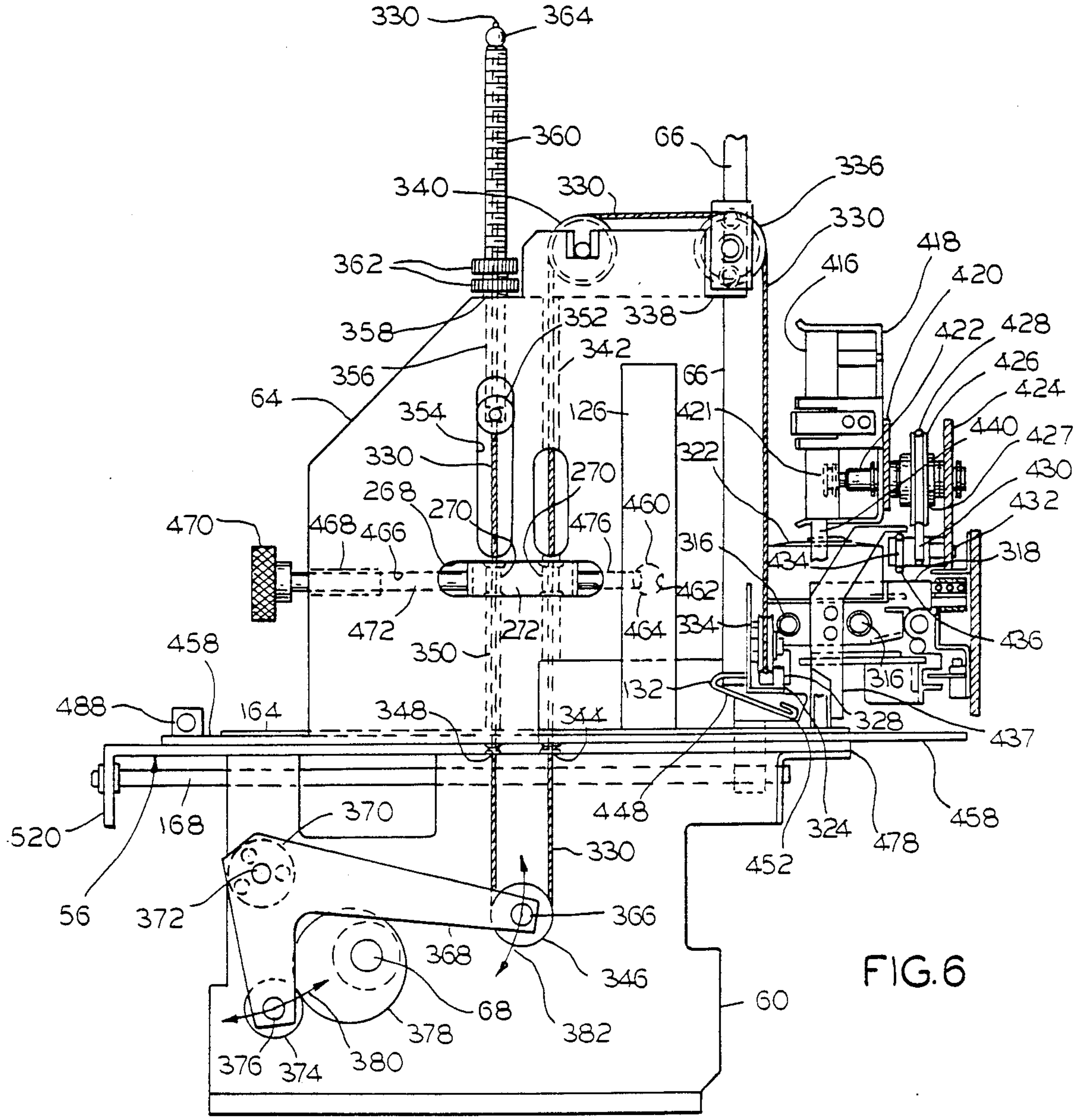
FIG. 6 is another partial cut-away side elevation view of the printing apparatus of the present invention, showing in particular the mechanism employed to control the lateral movement of the print head assembly.
Figure 10:
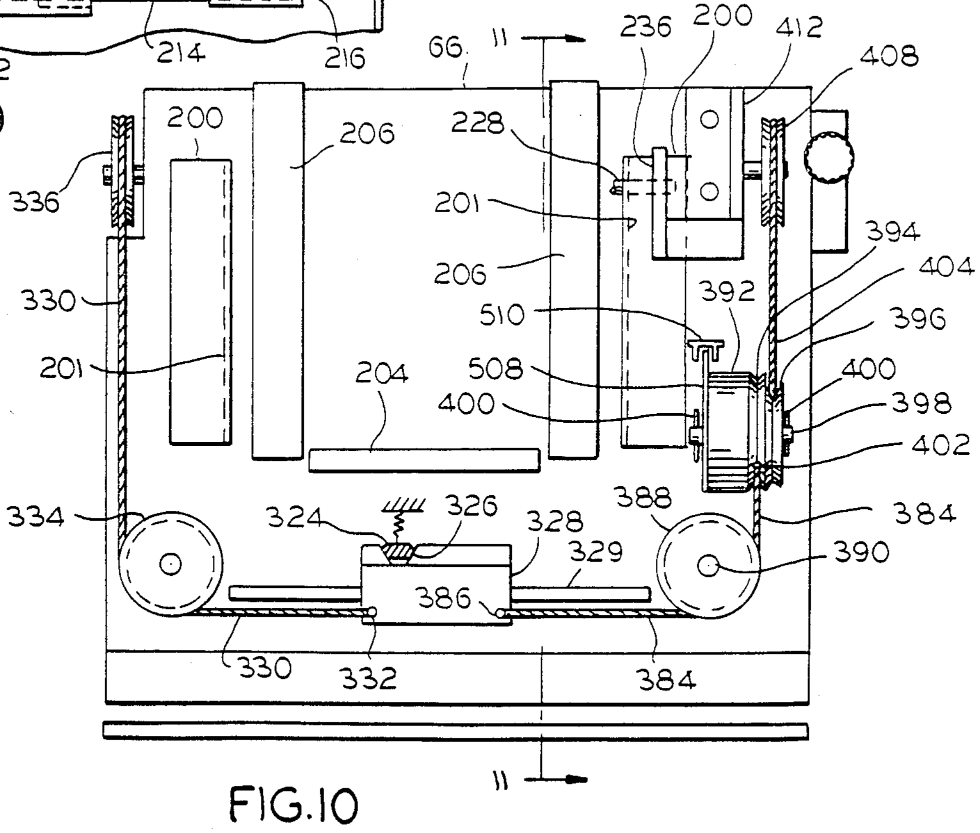
FIG. 10 is a partial front elevation view of the printer apparatus of the present invention with the print module assembly removed and showing the means for imparting lateral movement to the print module assembly.

The rear side of print head mounting block 318 includes a rearwardly projecting key 324 (FIGS. 4, 6 and 10) having convex side walls. Key 324 is adapted to removably be lodged in a V-shaped keyway slot 326 in a print head control block 328 when print head frame assembly 194 is mounted on face plate 66 by means of flanges 200 receiving edges 201 of plate 202. Print head control block 328 is slidably mounted on rail 329 fixed to face plate 66. The means for imparting lateral movement to print head control block 328 along a rail 329, to print head mounting block 318, and ultimately to ballistic print head module 322 comprises a print head cable 330 which is fastened at one end to control block 328 as at 332 (FIG. 10). Cable 330 extends around pulley 334 and then is directed upward over pulley 336 which is rotatably supported by a bracket 338 fastened to face plate 66 (FIG. 6). Cable 330 then extends around pulley 340 through a channel 342 extending vertically through the interior of upper side wall 64 and out of wall 64 at an aperture 344 where channel 342 intersects the plane of upper base plate assembly 56.

Cable 330 then reverses direction around pulley 346 and extends upward through aperture 348 into an additional channel 350 in the interior of upper side wall 64. Cable 330 is fixed to and extends through a marking block 352 which rides vertically in slot 354 in wall 64, and to which is secured a hollow rod 356. Rod 356 extends through channel 350 and out of wall 64 at aperture 358, and includes a threaded portion 360 on the exterior thereof. A pair of locking nuts 362 engage threaded portion 360, and the end of cable 330 is fastened to rod 356 at its uppermost end, as at 364. By loosening or tightening locking nuts 362, the tension in cable 330 can be adjusted. Calibrated gradation marks (not shown) on the interior of slot 354 indicate the position of marker block 352, permitting a user to return to a previous tension setting following servicing or adjustment of the print head block assembly transport mechanism, or to adjust the tension in cable 330.

Pulley 346 is rotatably mounted by pin 366 to the longer end of a boomerang-like lever arm 368, which in turn is pivotally mounted to the exterior of lower side wall 60 (FIGS. 4, 6) by means of bracket plate 370 and pin 372. The shorter end of boomerang-like lever arm 368 extends downward, and a cam follower 374 is rotatably mounted to the downward extension of lever arm 368 by means of pin 376. A print head drive cam 378 is rigidly fixed on main drive shaft 68 for rotation therewith, and cam follower 374 intimately engages cam 378.

As shaft 68 rotates, print head drive cam 378 rotates, driving cam follower 374 in an arcuate path as represented by the arrow 380 in FIG. 6. This motion drives pulley 346 in an arcuate path represented by arrow 382, whereby pulley 346 moves substantially up and down. Since the terminal end of cable 330 is fixed at 364, the portion of cable 330 shown on the right side in FIG. 6 moves up or down as cam 378 rotates, thereby imparting lateral motion along rail 329 to print head control block 328 attached to the other end of cable 330 at 332 (FIG. 10).

Figure 12:
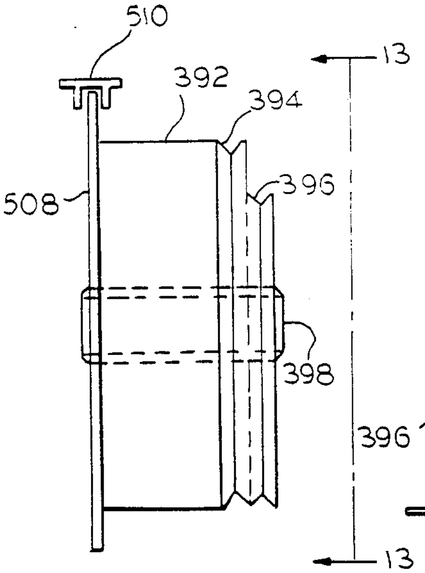
FIG. 12 is a detail side elevation view of the dual radius pulley illustrated in FIG. 11.
Figure 13:
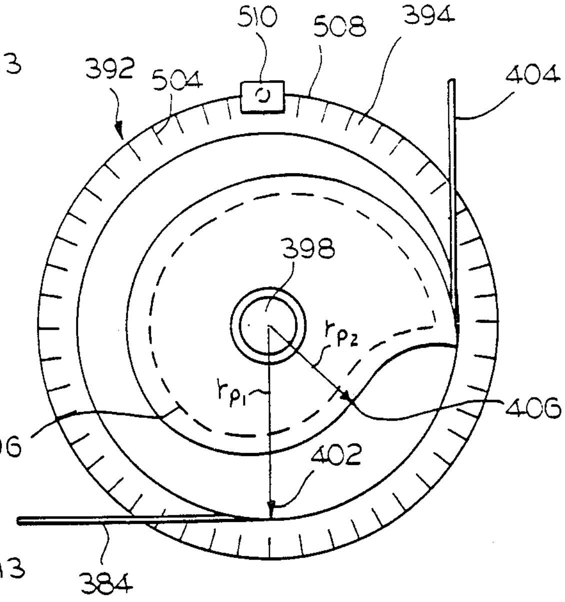
FIG. 13 is an elevation view of the dual pulley of FIG. 12 taken along the line 13—13 in FIG. 12.

Means are provided to supply a constant tension bias or return force to print head control block 328 to react against the movement of control block 328 caused by cable 330. Such means include a cable 384 (FIG. 10) attached to control block 328 at 386, and extending around a pulley 388 rotatably attached to face plate 66 by means of pin 390. Cable 384 then extends upward to a dual pulley 392 having a constant radius groove 394 and a spiral-like variable radius groove 396 adjacent one another (FIGS. 12, 13). Dual pulley 392 rotates about shaft 398, which is mounted to face plate 66 by a pair of brackets 400.

Figure 11:
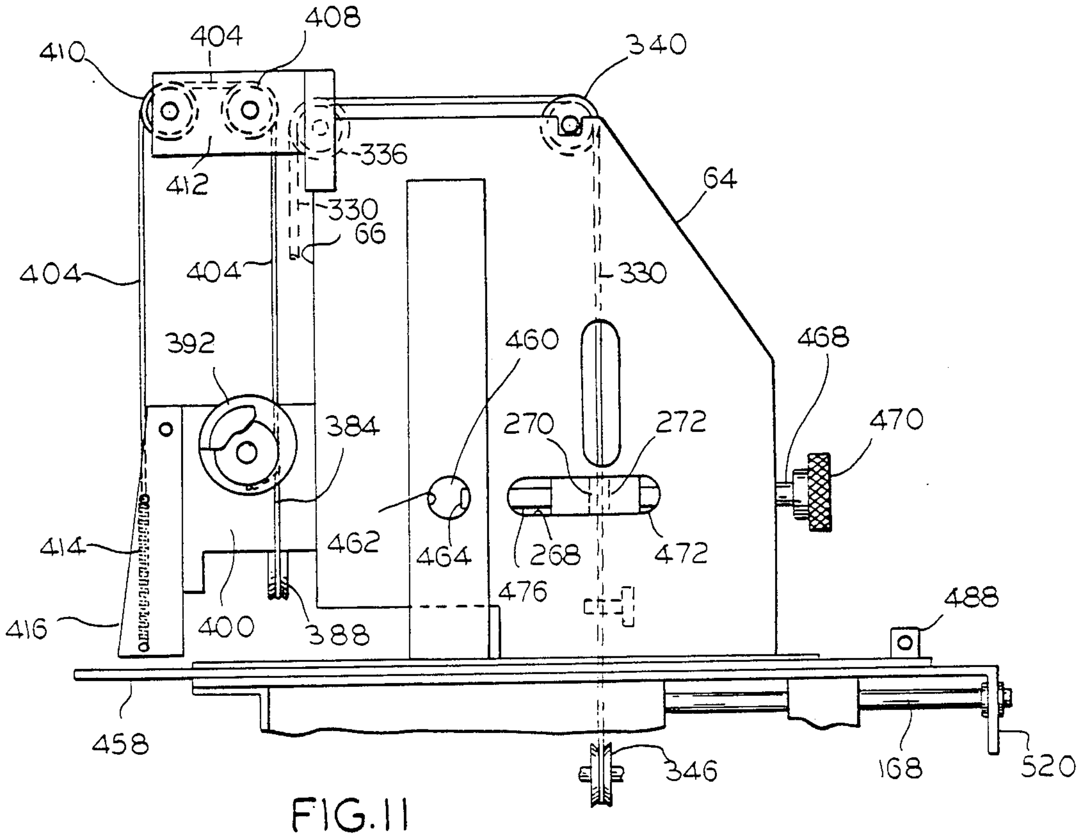
FIG. 11 is a partial side elevation view of the printing apparatus of the present invention, taken along the line 11—11 in FIG. 10.

Cable 384 is attached to a point 402 on the constant radius groove 394 of dual pulley 392, as shown in FIGS. 10 and 13. A separate return spring cable 404 is attached at one end to point 406 of variable radius groove 396 of dual pulley 392, and extends upward where it passes over a pair of idler pulleys 408, 410 rotatably mounted to face plate 66 by a bracket 412 (FIG. 11). Cable 404 then continues downward where it is attached to the upper end of return coil spring 414. The lower end of return coil spring 414 is fixed to a stationary bracket 416, which is mounted to the support structure by bracket 400.

The purpose of dual pulley 392 and the cables and springs attached thereto is to derive a constant force to act on print head control block 328 from an ordinary coil or extension spring 414 in either direction of travel control block 328. It is desirable to provide a spring force which does not change to maintain at a minimum the build-up of forces acting on print head control block 328 and consequently on the cam and other drive elements, thereby producing a constant bias load on control block 328. Several forms of constant force springs are available on the market, however, they are characterized as being expensive and having relatively short useful lives. By utilizing dual pulley 392 as illustrated in FIGS. 10–13, constant force, long life, and rapid operation of control block 328 are obtained from ordinary return coil spring 414.

The force applied by an ordinary coil spring is a factor of the degree of expansion of the spring. As the spring extends, it exerts a greater force. Referring to FIG. 13, the tension applied to cables 384 or 404 is the product of the force exerted on the cables multipled by the radius measured between the center of pin 398 and the point where the cable meets either groove 394 or 396 ($r_{p1}$ and $r_{p2}$). As control block 328 moves, cable 384 remains at a constant distance from pin 398. However, the distance between cable 404 and pin 398 changes as cable 404 pulls against spring 414. Therefore, as coil spring 414 expands, and the force it supplies increases, $r_{p2}$ decreases in a proportional amount. Thus, the force supplied by spring 414 and acting on cable 384 remains constant, regardless of the degree of extension of coil spring 414. Since cable 384 always operates at a constant radius relative to dual pulley 392, the force on cable 384 is always constant throughout the full range of movement of print head control block 328.

Means are provided on moveable print head mounting carriage 198 to removably hold an inked ribbon cartridge 416 in place, and to automatically feed ribbon from the cartridge in a stream beneath print head module 322 when print head module 322 is lifted and is being transported back to its "start print" position. Referring to FIG. 6, a generally U-shaped cartridge clamp 418 is supported by an interior wall element 420 of moveable print head mounting carriage 198. Cartridge 416 is removably mounted in clamp 418, and includes a feed spool 421 which feeds ribbon from the cartridge when rotated. A spindle 422 extends into spool 421 in cartridge 416 to advance the ribbon 440 from the cartridge. Spindle 422 is rotatably supported by interior wall 420 and another interior wall element 424 of moveable print head mounting carriage 198. Pulley 426 is fixed by means of a one way clutch 427 to spindle 422, and is adapted to be driven in one direction by belt 428 which extends around pulley 430 (FIG. 4). Pulley 430 is mounted on a shaft 432 (FIG. 6) which also includes a pulley 434 mounted directly thereto. A belt 436 extends around pulley 434, and also around pulley 438 (FIG. 4). Print head mounting block 318 is firmly fixed to one segment of belt 436 by bracket 437 (FIG. 6), whereby lateral movement of print head mounting block 318 in either direction by cam 378 and cable 330 causes belt 432 to move and rotate pulleys 434 and 438. The rotation of pulley 434 causes pulley 430 to rotate, thereby driving belt 428 and rotating pulley 426. When print head mounting block 318 is moving in its forward or print direction (left to right as viewed in FIG. 4), one way clutch 427 is disengaged, whereby rotation of pulley 426 is not transferred to spindle 422, and spindle 422 does not rotate, whereby the inked ribbon 440 in cartridge 416 does not advance. When print head mounting block 318 is moving in its return direction (right to left as viewed in FIG. 4), one way clutch 427 engages, whereby rotation of pulley 426 is transferred to spindle 422, driving the inked ribbon 440 (FIG. 6) from cartridge 416, around rollers 442, 444 and guides 443, 445 (FIG. 4), and beneath the tip 446 of ballistic head print module 322.

To replace ribbon 440, cartridge 416 is easily pulled horizontally and removed from clamp 418. The portion of inked ribbon 440 extending out of cartridge 416 readily slides off of guides 443, 445 and out from beneath tip 446 of print head module 322 (FIG. 4). Thus, the ribbon 440 does not get tangled in portions of the printing apparatus, and the cartridge 416 can be removed without interference from clamp 418. To replace ribbon 440, a new cartridge is inserted in clamp 418, with spindle 422 extending into feed spool 421 inside the cartridge. A small portion of inked ribbon 440 is manually extracted from cartridge 416, placed over guides 443, 445, and under print head tip 446. The ribbon and its associated feed mechanism are now ready to resume the printing operation.

FIG. 3 shows hopper 124 for holding a stack of return envelopes 50. Hopper 124 comprises front and rear envelope guides 128, 130, and a pair of side guides 126 (only one shown in FIG. 3) between which envelopes 50 are lodged. Rounded ledges 132, 133 maintain the envelopes in an elevated position until suction cups 134 engage the bottommost envelope and lower it to platform 164. Ledges 132, 133 are designed such that the bottommost envelope 50 can easily flex and thereby extend around the ledges as it is being pulled toward platform 164.

Once envelope 50 is placed on platform 164, pusher pins 166 transport envelope 50 under guide element 448. The forward limit of the stroke of pusher pins 166 is calibrated to move envelope 20 forward across platform 164 until the envelope is captured by envelope clamping means 450 (FIG. 5), as well as edge 452 of guide element 448 (FIG. 3). The position of envelope 50 is determined by the forward stroke of pusher pins 166. Envelope clamping means 450 is operatively connected by a floating connection to inwardly extending flange 308 of moveable print head mounting carriage 198 (FIG. 5). A pair of bolts 454 extend downward through flange 308, and then through a pair of spring washers 456 before they are attached to envelope clamping means 450. A portion of breaker plate 458 (which forms part of upper base plate assembly 56) extends beneath clamping means 450, and the envelope 50 is captured between breaker plate 458 and clamping means 450 when moveable head mounting carriage 198 is in its lowered position. The envelope 50 is held in position by clamping means 450 and edge 452 of guide element 448 while the print head module 322 moves back and forth, whereby a portion of the envelope is directly beneath the path of tip 446 of print head module 322. The envelope 50 is now in position to be printed with a bar code, as will be explained.

Hopper 124, as mentioned previously, includes guide members 126 and 130 which are horizontally adjustable to accommodate various size envelopes. Referring to FIGS. 5, 6 and 11, the two side guides 126 have flat vertically extending inner surfaces, and the outer surfaces 126 are supported by pins 460 which extend into channels 462 in upper side walls 62, 64 respectively. Pins 460 each have a flat portion 464 at the outer end thereof. A horizontally extending channel 466 is formed in the interior of walls 62, 64, into which is inserted a threaded shaft 468. Internal threads in channel 466 mate with threaded shaft 468, whereby rotation of knurled nob 470 on shaft 468 causes shaft 468 to move inward or outward in channel 466. Another shaft 472 disposed in channel 466 abuts threaded shaft 468, and extends into slotted portion 268 of wall 62 or 64, which slotted portion is in communication with channel 466 at either end thereof. Sliding block 272 is disposed for limited lateral movement in slot 268, and abuts the other end of shaft 472. The other end of sliding block 272 abuts shaft 476, which is disposed in channel 466. The opposite end of shaft 476 extends into channel 462 where it engages the flat portion of pin 460. Thus, when nob 470 is rotated in one direction, threaded shaft 468 moves into channel 466 (left to right in FIG. 5), which causes shaft 472 to move sliding block 272 to the right, thereby causing shaft 476 to bear tightly against the flat portion 464 of pin 460, holding pin 460 and envelope guide 126 rigidly in place. To adjust guide 126, nob 470 is rotated in an opposite direction, loosening sliding block 272, shafts 472 and 476, and enabling pin 460 to move laterally in channel 462. When each guide 126 has been properly positioned, nob 470 is tightened again as described above.

Referring to FIG. 5, it is apparent that the operating mechanism including shafts 468, 472 and 476 for engaging pin 460 of envelope guides 126, and the operating mechanism including head lift cable 254 both act in the same plane in the interior of wall 62, although the operative action of the mechanisms is perpendicular to each other. To permit the two mechanisms to intersect without interferring with each other, channel 270 is provided in sliding block 272, through which head lift cable 254 passes. Channel 270 is purposely made wide enough to permit cable 254 to avoid interference with the sides of channel 270 during the full range of horizontal movement of sliding block 272. This unique construction permits the two intersecting mechanical systems to operate independently and without interference in the same plane in the interior of side wall 62.

A similar structure is constructed in the interior of wall 64 (FIG. 6), where the mechanism for driving the print head control block 328 back and forth, including two runs of cable 330, operates in the same plane as, but perpendicular to, the mechanism for tightening or loosening pin 460 and guide 126. To accommodate the intersecting mechanisms, referring to FIG. 6, two channels 270 are provided in sliding block 272. The downward extending run of cable 330 passes through one channel 270, while the upward extending run of cable 330 passes through the other channel 270. Each channel 270 is wide enough to avoid interference with its respective run of cable 330 throughout the full range of adjustment of sliding block 272. Thus both intersecting mechanical systems operate in the interior of wall 64 without interfering with one another.

The present invention also provides means for adjusting the position of the print striking plate to alter the position on the envelope where the bar code is to be applied, while at the same time maintaining the synchronization between all operating elements of printing apparatus 40. Referring to FIG. 7, the elements comprising upper base plate assembly 56 include a base 478, a breaker plate 458, and a platform 164 which extends under tip 446 of print head module 322 and provides a strike plate against which the ballistic print head module 322 impacts during the printing operation. Platform 164, which receives envelope 50 after it is withdrawn from hopper 124 by suction cups 134, includes an opening 480 having downwardly extending flanges 482 which pass through an oversized opening 484 in breaker plate 458, and engage the edges of an opening 486 in base 478. Breaker plate 458 includes an upturned member 488 which is secured to a bracket 490 fixed to base 478. Bracket 490 includes a slot 492 which surrounds a pin 494 attached to base 478.

Breaker plate 458 extends toward an envelope guide spring 496 (FIG. 3) attached to insertion machine 20. Pivoting envelope gripper members 498 are also provided on insertion means 20 to grip each envelope as it leaves printing apparatus 40, and deliver the envelope 50 on transport raceway 18 of the insertion machine. Envelope 50 slides under guide spring 496 through an adjustable gap 500 formed between the extending outer edge of breaker plate 458 and the underside of envelope guide spring 496.

Since breaker plate 458 is horizontally adjustable without changing the position of platform 164 on base 478, gap 500 can be adjusted to accommodate envelopes 50 of varying thicknesses without changing the relative positions of the platform 164 or base 478.

Figure 8:
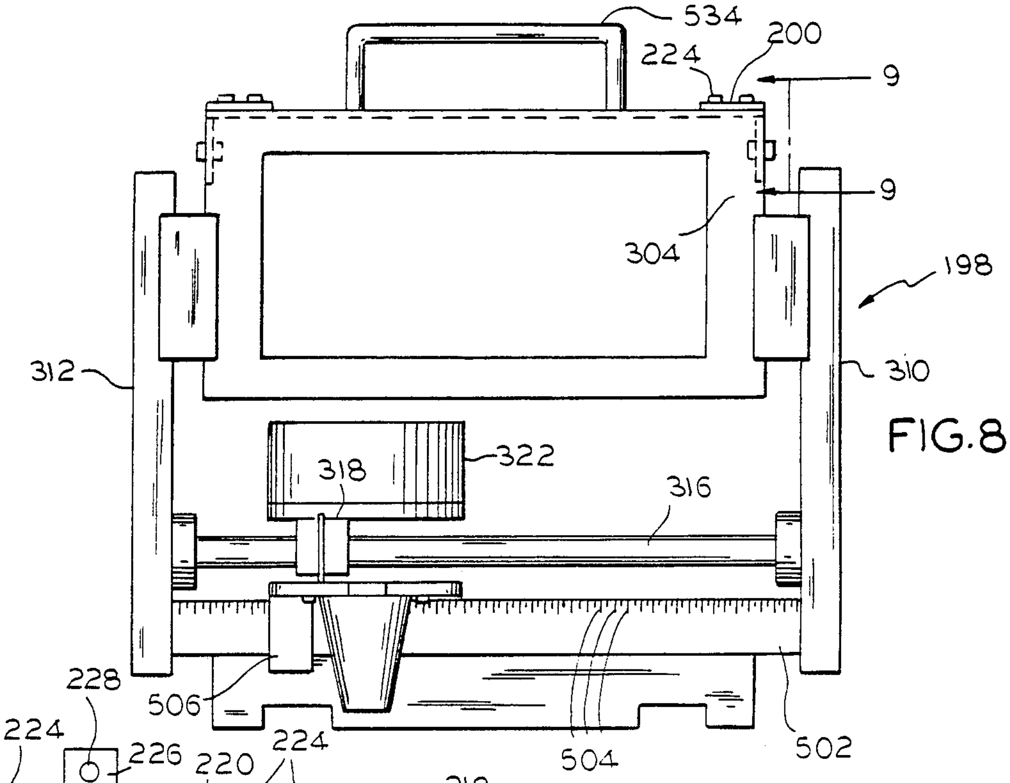
FIG. 8 is a partial front elevation view of the printer apparatus showing the location of the print inked ribbon cartridge support bracket, laterally moveable impact print head assembly, and bar-code spacing device for the print head assembly.
Figure 9:
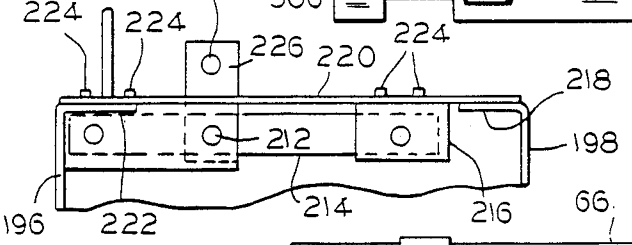
FIG. 9 is a detail view of the spring element support structure for the moveable print head mounting carriage assembly of the present invention, taken along line 9—9 of FIG. 8.

Referring to FIG. 8, means are provided to "tell" print module 322 when to print a bar on envelope 50, regardless of the speed of the power shaft 82 of insertion machine 20, or the speed at which the print head module 322 travels across rails 316. To this end, an encoder bar 502 extends across moveable head mounting carriage 198 between side panels 310 and 312. A plurality of equally spaced marks 504 of the same size span the length of encoder bar 502. A photosensor device, diagramatically illustrated at 506 in FIG. 8, is attached to print head mounting block 318, and is adapted to "read" the change from dark to light, or vice versa, caused by marks 504 as mounting block 318 travels transversely and "tell" print module 322 when to print, according to the pre-determined computer controlled input signal to print module 322.

In an alternate embodiment of the encoding bar 502, an encoding disc 508 is attached to the outward face of dual pulley 392 (FIG. 10). Encoding disc 508 also has a plurality of equally spaced marks 504 applied adjacent the circumference of the disc in a circular array. A photosensor unit 5510 is fixed to face plate 66, and is adapted to "read" marks 504 on disc 508 (FIGS. 10, 12, 13). Since the rotational position of dual pulley 392 is directly proportional to the position of print head control block 328, the photosensor 510 is triggered by the marks 504 in the same manner and for the same purpose as described above in conjunction with the embodiment of FIG. 8.

Referring to FIG. 4, a vane-type disc 512 is fixed to shaft 68 for rotation therewith. Disc 512 includes two portions of different diameter, and provides an "on-off" signal through photosensor 514 to "tell" the print head module 322 when to trigger the print cycle.

Means are provided to adjust the position of envelope 50 relative to the normal inserter hopper location. To this end, a bracket 520 (FIG. 3) extends downward from base 478, and includes an aperture 522 on either side thereof through which threaded shafts 524 extend. Threaded shafts 524 each engage a threaded aperture 526 which is disposed in a fixed extension 528 of the supporting structure of printer apparatus 40. Plate 478 is mounted atop side walls 58, 60 such that plate 478 can be loosened by a pair of thumb screws (not shown) for example, and thus be moved laterally (right to left or vice versa as viewed in FIG. 3) as desired. By rotating shaft 524 by means of knob 530, plate 478 and bracket 520 move in or out. This causes bracket 170 and slide rods 168 to also move, thereby causing the position of pusher pins 166, which are mounted on rods 168, to move. Thus, the position of pusher pins 166 can be manually adjusted to calibrate the distance pusher pins 166 will ultimately advance an envelope 50 under print head module 322. Once the position of plate 478 has been established, the thumb screws (not shown) are tightened, thereby securing the position of plate 478 relative to printing apparatus 40. To adjust the position of the bar code relative to the trailing edge 51 of the envelope 50, pusher pins 166 are manually adjusted on a carriage which supports the pusher pins 166 on slide rods 168.

The operation of printer apparatus 40 commences by attaching the apparatus to insertion machine 20 by suitable attachment means such as diagramatically depicted at 516 (FIG. 3), attaching drive belt 84 between insertion machine drive shaft 82 and shaft 80 of printer apparatus 40, and making certain pre-run adjustments and calibrations to various operating elements of the printer apparatus. For example, the position of plate 478 and pusher pins 166 are adjusted as described in the immediately preceeding paragraph. The size of hopper 124 is adjusted by loosening knurled knobs 470 such that shafts 476 allow pins 460 to move laterally, whereby envelope guides 126 (FIG. 3) can be moved laterally to correspond to the size of return envelopes 50 to be imprinted with a bar code 52. After guides 126 have been properly positioned, knurled knobs 470 are rotated, tightening shafts 476 against pins 460, thereby locking guides 126 in place.

Prior to operation, the program associated with optical scanner 42, which interprets the signal generated by marks 46 on billing statements 14 (FIG. 1), is pre-set to trigger ballistic head print module 322 to apply the appropriate bar code to an envelope 50 which is scheduled to be deposited on transport raceway on top of the appropriate billing statement 14. For example, in the embodiment of the present invention embodied in FIG. 1, printing apparatus 40 is approximately eight to ten stations ahead of the billing statement 14 which provides an input signal to the control for the return envelope imprinter. Therefore, the control for the printer apparatus necessarily includes delay and storage capabilities to permit the correct envelope 50 to be deposited atop the appropriate billing statement 14.

Figure 14:
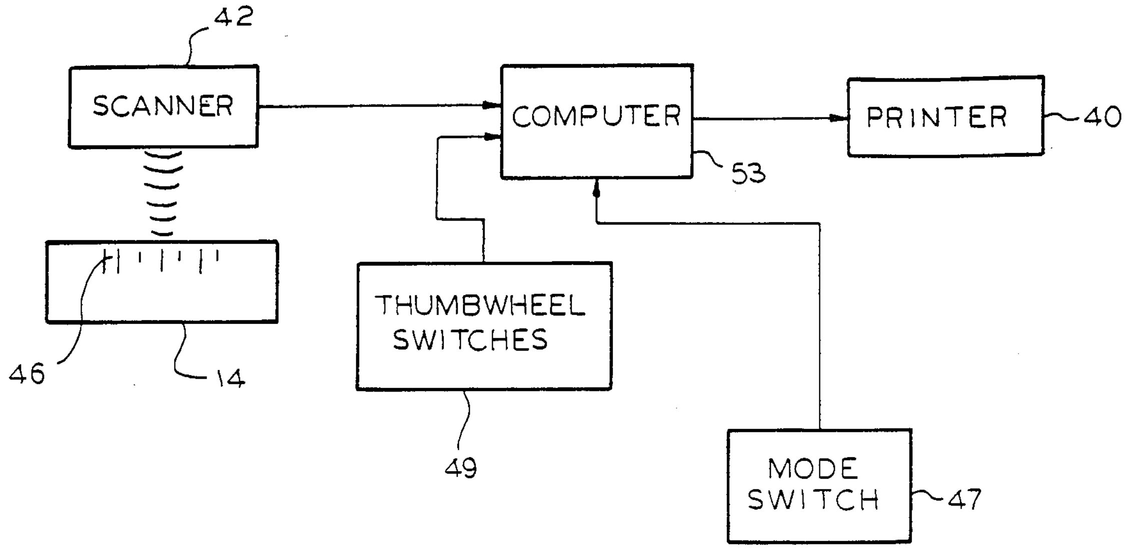
FIG. 14 is a schematic diagram of the electronic system which alternately transmits signals scanned from a series of marks on the computer generated documents to operate the printer, or transmits manually generated signals to operate the printer, or a combination of both.

In addition, the operator can program the printer apparatus control to print the proper bar code 52 responsive to the data encoded in marks 46 on billing statements 14. Referring to FIG. 14, the present invention includes two modes of operation programmed by mode switch 47 as it directs computer 53. In the first mode of operation, the bar code 52 printed on envelope 50 is determined by a signal generated in optical scanner 42 by marks 46 on continuous form billing statements 14. In the second mode, imprinting apparatus 40 prints bar code 52 on envelope 50 depending upon the position of manually adjustable thumbwheel switches 49 and from certain of the marks 46 on billing statement 14, which may, for example, indicate certain desired information. Of course, it would be obvious to one skilled in the art to construct a bar code imprinter which prints a bar code 52 on envelope 50 solely responsive to the positions of thumbwheel switches 49. Therefore, one pre-operation function of the present invention is to electronically create the desired bar codes which imprinter apparatus 40 is to apply to each return envelope 50.

The height of envelope feed elevator mechanism (FIG. 3) is adjusted to its appropriate maximum vertical height by dropping a stack of envelopes 50 in hopper 124 until they rest on ledges 132, 133. Shaft 68 is manually rotated by suitable means such as a handle 532 (FIG. 4) until cam 162, cam follower 158, and operating arm 148 raise plate 140 to a height whereby suction cups 134 come into contact with the underside of the bottommost envelope 50 in the stack in hopper 124. Eccentric mounting disc 152 (FIG. 3) is then rotated, and pins placed through apertures 156 (which extend through mounting disc 152 and operating arm 148) to ensure that suction cups 134 are elevated to the proper height by cam 162.

Breaker plate 458 is adjusted inward or outward (FIG. 3) to set gap 500 in accordance with the thickness of the envelopes 50 to be imprinted. Also, the setting of gap 500 is a function of placing each envelope in a proper forward position where it can be picked up by the swing of gripper member 498 after the bar code imprinting process has been completed. Breaker plate 458 is adjusted without changing the position of platform 164, which forms the striker surface under tip 446 of print head module 322, and serves as the back-up or impact surface for the ballistic printing process. It is important to maintain the proper position of platform 164 over the full range of adjustment of breaker plate 458 and gap 500, so as not to disturb the functioning between print head module 322 and platform 164.

Upon commencement of operation of printer apparatus 40, print head frame assembly 194 may be separated from face plate 66 and the main support structure of printing apparatus 40. Under such circumstance, it is necessary to install print head frame assembly 194 in its operative position by grasping the assembly by handle 534 (FIG. 8), raising head frame assembly 194 above and adjacent face plate 66, and lowering assembly 194 such that edges 201 of plate 202 are inserted into flanges 200 (FIG. 4). Print head frame assembly 194 is lowered along face plate 66 and frictionless strips 206 until the lower edge of plate 202 abuts stop member 204. Frictionless strips 206 ensure that assembly 194 is smoothly inserted in flanges 200. At this point, assembly 194, and its two major components, i.e.: fixed carriage assembly 196 and moveable print head mounting carriage 198 are properly positioned adjacent face plate 66.

As print head frame assembly 194 is lowered into flanges 200, two important operative connections are automatically completed. First, clevis pin 228, which extends horizontally from lever arm 226, rides into V-shaped slot 242 of clevis arm 236 (FIGS. 4, 5) until it is wedged at the bottom of the slot. Reciprocal movement of clevis pin 228 will now cause clevis arm 236 to rotate shaft 212, upon which clevis arm 236 is mounted, as previously described.

Second, key 324 (FIG. 10) on the rear side of print head mounting block 318 (FIG. 6) slides downward into V-shaped keyway slot 326 in print head control block 328 as print head frame assembly 194 is lowered into flanges 200. Key 324 is spring biased downward into slot 324, where it fits snugly against the sloping side walls of slot 324. Thus, as control block 328 moves laterally on rail 329, as described previously, key 324 and print head mounting block 318 also move laterally, without slack, under the influence of block 328 because of the interaction of key 324 and keyway 326.

Once assembled and adjusted, the operation of printing apparatus 40 and its interface with insertion machine 20 is as follows: as shaft 82 of insertion machine 20 rotates, rotative power is delivered to main drive shaft 68 through belts 84 and 74. A stack of return envelopes 50 to be imprinted with bar code 52 are placed either side up in hopper 124, which has previously been adjusted to correspond to the size of the envelopes inserted in the hopper.

Rotation of shaft 68 causes elevator cam 162 to rotate, driving cam follower 158 which initially urges suction cup operating arm 148, plate 140, and suction cups 134 upward (FIGS. 3, 4). A valve is opened (not shown) which applies a vacuum force to suction cups 134 by means of hose 142. As suction cups 134 reach the upper limit of their travel under the control of operating arm 148, the cups engage and adhere to the underside of the bottommost envelope 50 in the stack 124. At this point, cam 162 goes over center, reversing the direction of motion of cam follower 158 and operating arm 148, and lowering suction cups 134 and attached envelope 50. The envelope flexes over rounded ledges 132, 135 and is deposited on platform 164 directly beneath hopper 154. Ledges 132, 135 retain the remainder of envelopes 50 in the hopper, and ensure that only one envelope at a time is deposited on platform 164. Suction is then automatically choked from hose 142.

The continued rotation of shaft 68 also rotates disc 190 and cam follower 188 (FIGS. 3, 4), which drives bell crank lever 182, arm 180, operating arm 174, and pusher pins 166. The timing relationship between disc 190 and elevator cam 162 (both are mounted on shaft 68) is such that as an envelope 50 is deposited on platform 164, pusher pins 166 are behind envelope 50 (to the left as viewed in FIG. 3). Bell crank lever arm 182 is then driven forward (to the right as viewed in FIG. 3) causing pusher pins 166 to move to the right and advance envelope 50 beneath guide element 448 to an imprinting position whereby a pre-determined portion of the envelope is directly beneath the horizontal path of tip 446 of ballistic head print module 322. The forward limit of the envelope's position is determined by the pre-set adjustment to the stroke of pusher pins 166, as previously described. At this point in the sequence of operations hereindescribed, print module 322 is in its "start-print" position, which is laterally off to one side of the location on the envelope where the bar code 52 is to be applied.

The timing relationship between disc 190 and elevator cam 162 is also such that as the direction of bell crank arm 182 is reversed, thereby driving pusher pins 166 to the left (FIG. 3), suction cup operating arm 148 is again being driven upward to retract the next envelope 50 from hopper 124. By the time pusher pins 166 have reached the rearmost position of their movement, the next envelope is on platform 164 waiting to be engaged by pusher pins 166 and be advanced to the printing station.

As envelope 50 is advanced beneath guide element 448 and print module 322, shaft 68 rotates head lift cam 302 (FIGS. 3, 4, 5), which drives cam follower 302, and head lift lever arm 290. Upward movement of the right end (FIG. 5) of arm 290 causes cable 254 to move upward. The force of a spring provided on moveable print head mounting carriage 198 causes the mounting carriage to be vertically lowered as clevis pin 228 moves to the right, allowing clevis arm 236 to rotate clockwise (FIG. 5), thereby permitting lift arms 214 which support moveable print head mounting carriage 198 to rotate downward. As indicated previously, the motion of mounting carriage 198 is vertical in conjunction with the arcuate movement of lift arms 214 as a result of the parallelogram-type mechanical linkage afforded by spring elements 220, 230.

As mounting carriage 198 is lowered by cable 254 and clevis pin 228, two primary additional operations take place. First, clamping means 450 is lowered to capture envelope 50, not shown, between the clamping means and breaker plate 458 (FIG. 5), and hold the envelope against movement. Spring washers 456 bias clamping means 450 downward, and allow the clamping means to provide the force necessary to hold envelope 50 stationary, regardless of the thickness of the envelope. The clamping means 450, as shown in FIG. 5, is shown in juxtaposition to breaker plate 458. The presence of an envelope 50, not shown in FIG. 5, would raise the clamping means 450 against the resilient spring washers 456 upwardly to accommodate the envelope thickness.

Second, print head module 322 is lowered to a position whereby the horizontal path of tip 446, and the portion of inked ribbon 440 directly beneath tip 446, are directly over envelope 50. The print module is now in its "start-print" position, and is awaiting the signal to start moving laterally and to start printing. The appropriate vertical position of moveable print head mounting carriage 198 is adjusted by rotating nuts 256 on threaded portion 258 of cable 254, which bear against clevis lever arm 244 (FIG. 4).

The continued rotation of shaft 68 rotates print head transport cam 378, reciprocally driving cam follower 374 and boomerang-like lever arm 368 (FIG. 6). This motion initially causes pulley 346 to move downward, causing the right hand run of cable 330 (FIG. 6) to move downward while the left hand run of cable 330 is fastened at its end 364 and remains stationary. The distance that cable 330 moves downward is equivalent to the horizontal distance print head mounting block 318 and print head control block 328 (FIG. 10) are pulled by cable 330 as it extends around pulleys 340, 336, and 334 (FIGS. 6, 10). As control block 328 moves horizontally under the influence of cable 332 and against the tension force of return spring 414 acting on control block 328 through dual pulley 392, key 324 in keyway slot 326 advances print head module 322 to its left hand "start-print" position along rails 316, as seen in FIG. 4. As print module 322 is moved horizontally by return spring 414, the ballistic print head module 322 receives signals generated at optical scanner 42 by marks 46 (FIG. 1), and controls the imprinting of a predetermined bar code on envelope 50. As print module 322 advances, marks 504 on encoder strip 502 (FIG. 8) or on encoder disc 508 (FIG. 13) ensure that bar code 52 is applied to envelope 50 at properly spaced intervals. As mentioned before, the spacing of the interval between printing operations of print module 322 is controlled by encoder marks 504. As control block 328 is advanced to its FIG. 4 "start-print" position, cable 384 is unwound from dual pulley 392, and cable 404 is wound on variable radius groove 396 of dual pulley 396, thus maintaining a constant tension force on control block 328 as it moves horizontally during the printing cycle.

During the advancement of print module 322 along rails 316 during the "printing" phase of the cycle of movement of the print module, inked ribbon 440 remains stationary, and the tip 446 of print module 322 impacts against a fresh portion of the inked ribbon each time an image is applied to the envelope. This is due to the fact that as belts 428 and 436 rotate pulley 426, one way clutch 427 does not cause rotation of ribbon drive spindle 422. The proper adjustment of the length of travel of print module 322 is made by rotating nuts 362 (FIG. 6) which controls the stroke of cable 330 caused by lever arm 368.

After the appropriate bar code 52 has been applied to envelope 50, several operations occur substantially simultaneously, due to the timing relationship of the operating elements of printer apparatus 40 driven by main drive shaft 68. First, moveable head mounting carriage 198 moves vertically upward under the influence of clevis pin 228, cable 254, head lift lever arm 290, and head lift cam 302 (FIG. 5). This action lifts clamping means 450 from the envelope 50 which has just been imprinted with a bar code 52, and also lifts tip 446 of print module 322 above and away from the imprinted envelope. Envelope 50 is now free to be engaged by gripper member 498 (FIG. 3) which swings outward and delivers the imprinted envelope beneath envelope guide spring 496 and on to transport raceway 18 for ultimate stuffing into mailing envelope 36 (FIG. 1).

Second, print head transport cam 378 continues to rotate, whereby lever arm 368 moves upward, releasing the tension force applied to cable 330, and permitting cable 384 and return spring 414 acting through dual pulley 392, and control block 328 to return print head mounting block 318 and print module 322 along rails 316 to the "start-print" position.

Third, belt 436, which is attached to print head mounting block 318, and belt 428 cause pulleys 434, 430 and 426 to rotate in the opposite direction these pulleys were rotated during the print phase of the cycle of movement of print module 322. During this return cycle, however, one way clutch 427 engages spindle 422, and the spindle is driven by pulley 426, which rotates feed spool 421 and advances the inked ribbon a predetermined distance out of cartridge 416 and across tip 446 of print module 322.

The force of return spring 414 acting on print head control block 328 as the control block returns is kept at a constant value despite the change in length of spring 414. Cable 404, which was previously wrapped around variable radius groove 396 of dual pulley 392 during the forward or printing motion of control block 328, unwinds from the variable radius groove 396 as spring 414 shortens. The tension force applied by spring 414 on cable 384 remains at a constant value since the larger force applied by spring 414 at its elongated position is applied to cable 384 through the smaller radial distance between shaft 398 and groove 396. As spring 414 decreases in length and its inherent force value decreases, this force is applied to cable 384 through a larger radius between shaft 398 and groove 396. Thus, the tension forces acting on block 328 during both its advance and return movement remain at a constant value.

As imprinted envelope 50 is removed from breaker plate 458 by gripper arms 498, a new envelope 50 is inserted by pusher pins 166 onto the portion of platform 164 and breaker plate 458 which extends beneath print module 322 and clamping means 450, after being withdrawn from hopper 124 by suction cups 134. The above described clamping, imprinting, release and envelope removal process described above is then repeated.

Those who are skilled in the art will readily perceive how to modify the inventive concepts and embodiments disclosed above. Therefore, the appended claims are to be construed to cover all equivalent structures which fall within the true scope and spirit of the invention.

We claim:

1. An apparatus for applying a constant tension force to a moving element (328) including means (330, 384) to drive said element (328) from a first position to a second position, constant tension means operatively connected between a fixed support and said moving element to bias said element to return towards said first position, said constant tension means including: coil spring means (414) connected at one end to said fixed support (416), and at the other end to a first cable (404), said first cable (404) also adapted to wind around a first variable radius groove (396) in a dual rotatable pulley (392), a second cable (384) connected to said moving element (328) and also adapted to wind around a second constant radius groove (394) in said said dual rotatable pulley, said constant radius groove (394) and said variable radius groove (396) being co-axial, whereby movement by said element (328) from said first position to said second position causes said coil spring to elongate, causes said first cable to wind around said variable radius groove (396) whereby said first cable (404) changes from a maximum radius point of contact with said variable radius groove (396) to a minimum radius point of contact with said variable radius groove (396), and causes said second cable (384) to unwind from said constant radius groove (394), whereby the force exerted by said coil spring (414) on said moving element (328) through said dual rotatable pulley (392) and said first and second cables remains second constant as said moving element (328) is driven from said first position to said second position.

2. The apparatus of claim 1 whereby movement of said element from said second position to said first position causes said coil spring to retract and said first cable to unwind from said first variable radius groove whereby said first cable changes from a minimum radius point of contact with said variable radius groove to a maximum radius point of contact with said variable radius groove, and causes said second cable to wind around said second constant radius groove whereby the force exerted by said coil spring on said moving element through said dual rotatable pulley and said first and second cables remains constant as said moving element is driven from said second position to said first position.

3. An apparatus for applying a constant tension force to a moving element including means to drive said element from a first position to a second position, constant tension means operatively connected between a fixed support and said moving element to bias said element to return towards said first position, said constant tension means including: coil spring means connected at one end to a fixed support and at the other end to a first cable wound around one groove of a dual grooved rotatable pulley, said pulley being rotatable about a fixed axis, a second cable wound at one end around a second groove of said dual grooved rotatable pulley and connected at the other end to said moveable element, whereby movement of said moveable element by said drive means causes the effective radius between said axis and the point where said first cable contacts said first groove to vary as said coil spring changes length.

4. The constant tension apparatus of claim 3 wherein the force on said second cable applied by said coil spring remains constant throughout the full range of movement of said moving element, whereby torque applied to said second cable remains constant as the radius between said axis and said point of contact between said first cable and said first groove varies proportionately as said coil spring changes length.

* * * * *